Oct. 24, 1967  I. P. JANKOVSKY ETAL  3,348,278
AIR SUSPENDED VIBRATIONAL MOLD
Filed Jan. 6, 1965

3,348,278
AIR SUSPENDED VIBRATIONAL MOLD
Ivan Pavlovich Jankovsky, ulitsa Karla Marxa 25, apt. 5; Grigory Ignatjevich Kholodinsky, 2nd Kokhovsky pereulok, 8, apt. 16; and Viktor Mitrofanovich Skljadnov, ulitsa Jamnaja 3, apt. 18, all of Minsk, U.S.S.R.
Filed Jan. 6, 1965, Ser. No. 423,795
13 Claims. (Cl. 25—41)

The invention relates to the methods of material compaction by vibration in the installations incorporating a vibratory platform equipped preferably, though not exclusively, with motor-driven vibrators.

The present invention can be employed, for example, for the compaction of concrete in the process of manufacturing reinforced-concrete elements, for the compaction of moulding sand in metal casting, etc.

The methods of material compaction by vibration known at present are based on the principle that the unidirectional forces intermittently generated by the vibrators and imparted to the body (i.e. platform) being vibrated, are taken up by the spring-type or other similar supports of the vibrated body, and, owing to the shock-absorbing properties of said supports, are again conveyed to the vibrated body in the direction opposite to that of the forces initially generated by the vibrators. Due to the vibration resulting during this process, the material located on the platform being vibrated is subjected to compaction. Consequently, the employment of springs or other similar supports is an indispensable prerequisite for carrying out the existing method of material compaction by vibration.

However, the employment of spring-type supports involves a number of difficulties, of which the principal ones are analyzed below.

In order to take up the forces originated at vibration in the spring supports, sturdy foundations must be constructed, their weight, as a rule, amounting to twenty times the maximum total weight of the material being compacted, the mould containing said material, and the vibratory platform. However, the provision of foundations fails to completely damp the vibrations which adversely affect the adjacent structures of the working premises, etc., and impair the physical condition of operating personnel. Operation of platform vibrators is accompanied by intensive noise, while their drives consume too much electric power. The latter circumstance is caused by the fact that it is practically impossible to run the vibrating installation at a duty close to the resonant one, or to maintain this duty when required, because the characteristics of at least one of the spring supports always differ from those of the others. Moreover, the manufacture of spring supports involves a large consumption of high-grade metal.

An object of this invention is to eliminate the above disadvantages.

The main object of the invention is to dispose of the spring-type or other similar supports in the installations for the embodiment of the method of material compaction by vibration.

According to the present invention, said object is achieved by lifting the platform, for the period of actual vibration, above the base of the installation by means of compressed air being fed into the space between the platform and the base, with the purpose of forming an air cushion.

The air cushion, as a damping means, is effectively used in transportation conveyances, for example, in motor cars, however, its employment for process needs and, in particular, for compaction of material, has not been known up till now.

By virtue of replacing the spring-type supports with the air cushion, the forces generated during vibration are being conveyed not through separate points, as it is the case with the spring supports, but are simultaneously and uniformly distributed over the entire area occupied by the air cushion, which eliminates all the disadvantages resulting from the use of spring-type and other similar supports, and also accounts for a number of additional advantages, to be analyzed below.

Compressed air required for producing the air cushion should be preferably fed at a pressure ensuring an equilibrium between the weight of the platform carrying the mateial to be compacted, and the lifting force of the air cushion.

The installation for the embodiment of the method of the present invention should comprise a vibratory platform, a base with the supports for the latter, and an arrangement for supplying compressed air into the space between the vibratory platform and the base.

In accordance with one of the embodiments of the invention, the platform in the lifted position is not connected with the base, the latter being provided with rests intended for preventing horizontal shifting of the platform, that might be caused by accidental external forces arising during compaction. Said rests may be made in the shape of vertical walls forming a closed contour.

In this form of the invention, the feed or inlet pipe of the compressed air charging arrangement should be preferably located in the centre of the installation base, and the bottom surface of the platform should be made spherical or nearly spherical of shape.

According to another form of the invention, the bottom surface of the platform may be flat. This being the case, it is desirable to equip the base of the installation wtih a a closed chest having a perforated upper wall which would ensure uniform air distribution under the platform, while the platform itself should be provided with a flexible continuous screen fastened to the platform bottom surface and freely resting upon the base. In this form of the installation embodiment, air consumption will be lower than in the first one.

To ensure minimum consumption of compressed air, and to maintain the vibratory platform in a stable position during operation (i.e. to preclude horizontal displacement), the flexible screen may be secured to the closed-contour chest which accommodates the compressed air inlet pipe. The combined unit incorporating the platform and its base should be made preferably of the portable type, while the chamber formed by the chest and the platform should be hermetically sealed.

In the latter of the versions described above, in order to prevent the transmission of vibrations from the platform to the base through the flexible screen, a device should be provided for controlling the pressure of compressed air producing the air cushion, in accordance with the weight of the material being compacted. The actual air pressure should be such that the flexible screen would not be converted into a stiff element.

The device for controlling compressed air pressure may be made in the form of an electrocontact pressure gauge connected with the compressed air feed main. In this case the pressure gauge should be electrically interlocked with the electric motors of the vibrators and should be preset so that it would automatically start the vibrators as soon as the required pressure is obtained, the latter being selected so as to maintain the necessary equilibrium between the weight of the platform carrying the material to be compacted and the lifting force of the air cushion.

In order that the invention may be readily understood, a description is given hereafter with reference to the accompanying drawings, in which.

Figure 1:
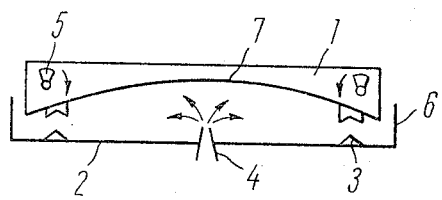
FIG. 1 is a diagram of one of the possible forms of the installation for material compaction by vibration, in accordance with the method claimed herein, the vibratory platform in the lifted position in this case being not connected with the base of the installation.

The installation for the embodiment of the method according to the invention, as presented in FIG. 1, comprises vibratory platform 1, base 2 with supports 3 for platform 1, and arrangement 4 for charging compressed air into the space between platform 1 and base 2. Compressed air lifts platform 1 above supports 3, and in this position the material placed on the platform is subjected to compaction by vibration with the aid of vibrators 5.

Since the installation comprises no spring-type or other damping supports connecting platform 1 with base 2 during vibratory treatment of the material, no vibrations are transmitted to base 2, which makes the construction of the foundation superfluous. In order to prevent horizontal displacement of the platform that might be caused by accidental external forces generated in the course of vibratory treatment of the material, the base is provided with rests 6 which may have the shape of vertical walls forming a closed contour. The feed pipe of compressed air charging arrangement 4 is located in the centre of base 2, while bottom surface 7 of the platform is made approximately spherical, which provides for uniform air distribution during platform lifting and ensures its horizontal position.

The installation illustrated in FIG. 1 is simple of design, but requires a high rate of compressed air consumption.

Figure 2:
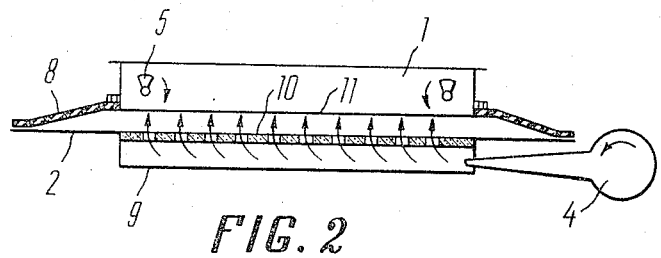
FIG. 2 is a diagram of another form of embodiment of the installation, in which the platform is provided with a continuous flexible screen freely rested upon the base.

In order to reduce compressed air consumption, vibratory platform 1 can be furnished with flexible screen 8 (FIG. 2) having a continuous contour and resting upon base 2. In this modification of the installation, base 2 may be provided with closed chest 9 having a perforated upper wall 10 intended to ensure uniform distribution of compressed air under platform 1, while bottom surface 11 of the platform may be flat. In the idle state, screen 8 takes a horizontal position, but when compressed air is being fed under platform 1 by means of charging arrangement 4, for example, by means of a blower, through the holes in upper wall 10, the screen takes an inclined position, as illustrated in FIG. 2.

Figure 3:
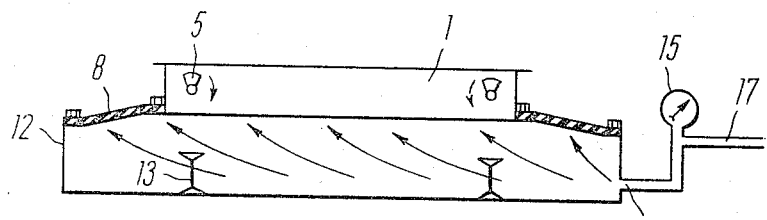
FIG. 3 is a diagram of another modification of the installation, in which the vibratory platform is connected by means of a continuous flexible screen to the base of the installation.

To ensure minimum compressed air consumption, and to secure stability of vibratory platform 1 during operation, so as to prevent its horizontal displacement, flexible screen 8 can be fastened to closed-contour chest 12, as shown in FIG. 3. The joint fastening of screen 8 to platform 1 and chest 12 should be airtight. Chest 12 should be fitted with supports 13 for platform 1 to rest upon, when in the idle position, and should have compressed air feed hole 14. The installation can be made of portable type.

In the above-described form of the installation, vibratory platform 1 and the base (i.e. chest 12) are connected by means of flexible screen 8. Therefore, when the pressure of compressed air which forms the cushion is such that summary pressure upon the platform base exceeds the weight of the platform loaded with the material to be compacted and supported by said air cushion, screen 8 may be converted into a stiff element, and begin to transmit vibrations from the platform to the base.

However, the air pressure must be sufficiently high, at least to ensure lifting of platform 1 from supports 13.

Figure 4:
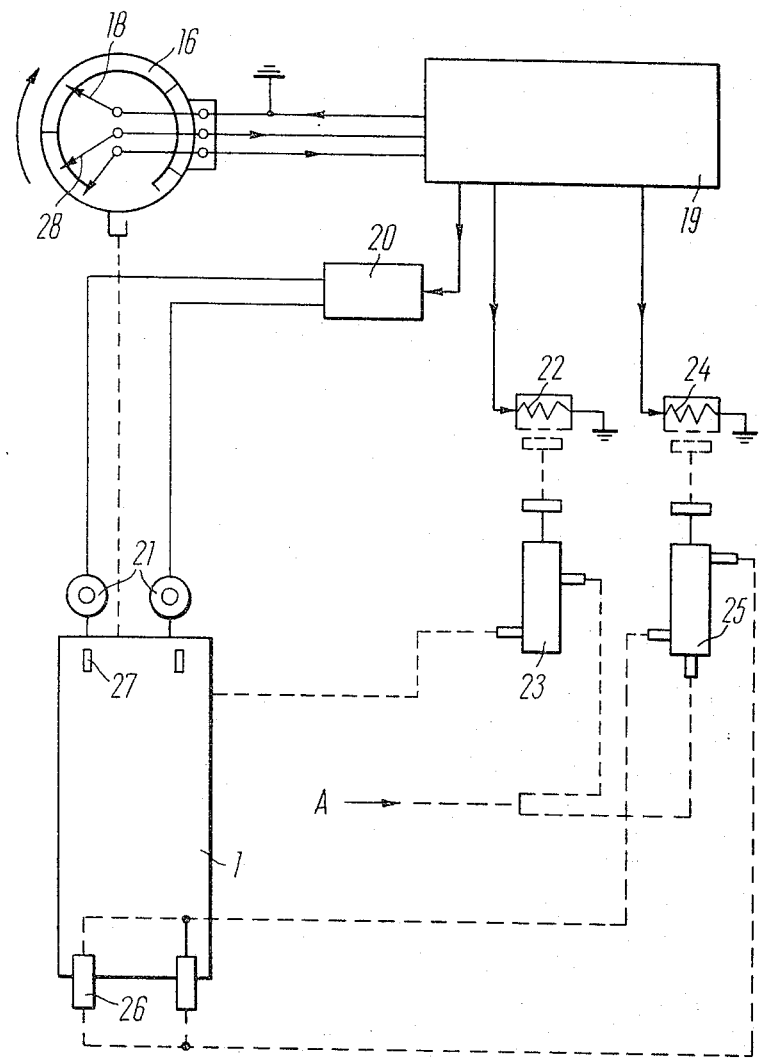
FIG. 4 is a diagram of the electropneumatic system, illustrating the functioning of the electrocontact pressure gauge intended for controlling the pressure of compressed air which forms the air cushion under the vibratory platform.

To provide for this, the installation is equipped with arrangement 15 intended for controlling the pressure of compressed air. Said arrangement may be in the form of an electrocontact pressure gauge 16 (FIG. 4) in communication with a compressed air feed main 17. Pressure gauge 16 has a sliding contact 18 by means of which the required pressure is preset on the scale of the pressure gauge. This pressure should be such as to ensure equilibrium between the weight of platform 1 with the material to be compacted, and the lifting force developed by the air cushion. Sliding contact 18 is connected, via control panel 19 and magnetic starter 20, with electric motor 21 which drives the vibrators. The electric circuitry of the installation also incorporates winding 22 of electropneumatic valve 23 through which compressed air flows (in the direction of arrow A, FIG. 4) from the source of compressed air supply underneath platform 1. Besides, the electric circuitry comprises winding 24 of electropneumatic valve 25 through which compressed air flows from the source of supply to pneumatically-operated clamps 26. The mould placed on platform 1 is secured in position between pneumatically-operated clamps 26 and wedge rests 27.

After the required air pressure is set with the aid of sliding contact 18, electric current is fed to control panel 19. This causes electropneumatic valve 23 to operate, said valve admitting compressed air into closed chest 12. When air pressure in the chest rises to the pre-set value, pointer 28 of pressure gauge 16 reaches sliding contact 18 and closes the latter. Winding 22 of valve 23 is de-energized, and the valve shuts off air flow into chest 12. Thereafter, the mould with the material to be compacted may be placed on platform 1, and clamps 26 may be caused to operate, the respective command being given from control panel 19 through valve 25, the armature of which is controlled by means of winding 24.

Further, by means of a time relay installed on control panel 19, the desired time of material compaction is set, and electric motors 21 of the vibrators are started.

On expiration of the pre-set time, the installation stops automatically.

Provision can be made for equipping the electric circuitry of the installation with conventional accident-preventing devices and arrangements for precluding undesirable effects which might occur as a result of negligent operation, for example, starting electric motors 21 of the vibrators when the air cushion pressure has not yet reached the pre-set value, or when clamps 26 which secure the mould on platform 1 have not yet operated, or the like.

A special advantage of the present invention is that it ensures compaction of material by vibration at a frequency close to resonant operation, due to the absence of damping supports which form an obstacle to such operation. This results in a much lower consumption of electric power, and contributes to the general efficiency of the installation. Stable operation at the resonant frequency is ensured by controlling compressed air pressure inside closed chest 12.

Some of the other advantages obtainable from the present invention are:

(1) Elimination of expenditure of funds and labour on the construction of foundations.

(2) Elimination of occupational injury to the operating personnel, caused by vibrations.

(3) Economy of high-grade metal, otherwise required for the manufacture of spring supports.

(4) Longer service life of the equipment, due to the absence of spring supports which have been the cause, for example, of early wear of the platform frame at the places of support fastening.

(5) Process operations under industrial conditions are easily variable, since the installations, according to this invention, can be made portable.

(6) Possibility of developing vibratory installations of practically unrestricted size and load-lifting capacity.

(7) Higher labour efficiency.

What we claim is:

1. An apparatus for compacting materials by vibration comprising: a vibratory platform; a base constituted by a closed chest with a perforated upper wall underlying said platform; means for supplying compressed air via said chest between said perforated upper wall of said chest and said platform to lift the platform during vibration; and an elastic screen attached to the lower part of said platform to retain a cushion of air between said platform and the perforated upper wall of said chest.

2. An apparatus for compacting materials comprising: a vibratory platform; a base constituted by a chest which is open towards said platform; rests at the bottom of said chest to support said vibratory platform; an elastic screen attached to the lower part of said platform and to the upper part of said chest in an air-tight manner to define a closed chamber; and means for supplying compressed air to said chamber to provide an air cushion in said chamber at a pressure sufficient to lift said vibratory platform off said rests and to balance the weight of said platform and the material contained therein to be compacted.

3. An apparatus for compacting materials by vibration as claimed in claim 2 comprising vibratory drive means for said platform, and means to vary the pressure of the air cushion depending on the weight of the material to be compacted, the latter said means being connected to the air supply and being operatively connected to the drive means of said vibratory platform.

4. An apparatus for compacting materials by vibration as claimed in claim 3 wherein said means for varying the pressure comprises an electric contact pressure gauge.

5. Apparatus for compacting material by vibration comprising a vibratory platform adapted for containing material to be compacted by vibration, a hollow base beneath said platform, said base having at least one opening which faces said platform, means for supplying compressed air to said base to produce an air cushion between the base and the platform sufficient to support the platform in vertically spaced relation above the base, means for vibrating the thus supported platform, and means on said base for limiting relative horizontal movement between the base and platform.

6. Apparatus as claimed in claim 5 wherein the means for limiting relative horizontal movement between the base and platform comprises vertical walls on said base surrounding the platform in spaced relation.

7. Apparatus as claimed in claim 5 wherein said means for supplying compressed air to said base comprises an air feed pipe centrally located in said base and facing the platform.

8. Apparatus as claimed in claim 5 wherein said base has an upper wall in which a plurality of said openings are provided whereby said wall is perforate, said means for supplying compressed air to said base comprising an air feed conduit beneath said upper wall, said means for limiting relative horizontal movement between the base and platform comprising a flexible screen between the platform and base for retaining the compressed air therebeneath, said screen having a horizontal position when the compressed air is not supplied to the base.

9. Apparatus as claimed in claim 5 comprising supports on the base for the platform when the air is not supplied to the base.

10. Apparatus as claimed in claim 8 wherein said platform, base and screen define a hermetically sealed chamber for the compressed air.

11. Apparatus as claimed in claim 10 comprising means for controlling the pressure of the compressed air in accordance with the weight of the material being compacted to effect vibratory operation of the platform at substantially a resonant frequency.

12. Apparatus as claimed in claim 5 wherein said means for supplying compressed air to said base comprises a conduit for the feed of compressed air to said base, an electro-contact pressure gage in communication with said conduit, said pressure gage being coupled to said means which vibrates the platform to automatically actuate such means when the pressure of the air cushion reaches a preselected value to provide a vibrating frequency substantially equal to the resonant frequency.

13. Apparatus as claimed in claim 7 wherein said platform has a lower surface facing said base which is of spherical shape to provide uniform air distribution during platform raising while ensuring horizontal attitude.

References Cited

UNITED STATES PATENTS 3,107,158 10/1963 Ahlberg _____ 264—71
3,217,531 11/1965 Melton.

ROY B. MOFFITT, *Primary Examiner.*